United States Patent [19]

Veligdan

[11] Patent Number: 5,414,509
[45] Date of Patent: May 9, 1995

[54] OPTICAL PRESSURE/DENSITY MEASURING MEANS

[75] Inventor: James T. Veligdan, Manorville, N.Y.

[73] Assignee: Associated Universities, Inc., Washington, D.C.

[21] Appl. No.: 27,878

[22] Filed: Mar. 8, 1993

[51] Int. Cl.$^6$ .......................... G01P 3/36; G01B 9/02
[52] U.S. Cl. .................................. 356/349; 356/35.5; 356/357; 356/358; 356/345
[58] Field of Search ....................... 356/349, 35.5, 357, 356/358, 345

[56] References Cited

U.S. PATENT DOCUMENTS

| | | | |
|---|---|---|---|
| 4,586,821 | 5/1986 | Chandra et al. | 356/363 |
| 4,666,296 | 5/1987 | Bailly-Salins | 356/358 |
| 4,948,958 | 8/1990 | Sweeney | 356/349 |
| 5,102,231 | 4/1992 | Loewenstein et al. | 356/358 |
| 5,189,299 | 2/1993 | Zimmermann et al. | 356/73.1 |
| 5,268,739 | 12/1993 | Martinelli et al. | 356/349 |
| 5,274,436 | 12/1993 | Chaney | 356/349 |

FOREIGN PATENT DOCUMENTS 2-45790  2/1990  Japan ................................ 356/349

Primary Examiner—Rolf Hille
Assistant Examiner—Minhloan Tran
Attorney, Agent, or Firm—Margaret C. Bogosian

[57] ABSTRACT

An apparatus and method for rapidly and accurately determining the pressure of a fluid medium in either a static or dynamic state. The pressure is determined by making a measurement of the velocity of a light beam that is directed through the fluid medium along a pathway that enables an integrated pressure measurement to be made along the pathway, rather than making such a measurement only at a single point in the medium. A HeNe laser is configured to emit a beam of two frequencies separated by about 2 MHz. One of these beam frequencies is directed through the fluid medium and is reflected back through the medium to a non-linear diode detector. The other beam frequency is passed directly to a diode detector without traversing said medium. The diode detector is operated to determine the frequency shift or beat frequency between the two beam frequencies. Any variation in the frequency of said reflected beam that is caused by a change in its velocity as it is passed through the fluid medium causes a change in the beat frequency. This beat frequency change is then converted to an output signal value corresponding to the pressure of the medium. The measurement instrument apparatus is remotely positioned relative to the medium being measured, thus the apparatus is immune from electro-magnetic interference and can operate in conditions of high radiation, corrosion and extraordinarily high temperature.

9 Claims, 2 Drawing Sheets

OPTICAL PRESSURE/DENSITY MEASURING MEANS

This invention was made with Government support under contract number DE-AC02-76CH00016, between the U.S. Department of Energy and Associated Universities, Inc. The Government has certain rights in the invention.

FIELD OF THE INVENTION

The invention relates to a method and apparatus for the measurement of pressure/density in a fluid medium.

DESCRIPTION OF THE RELATED ART

When working around high pressure hostile environments, such as those encountered in pressurized bed nuclear reactors, the rapid, accurate measurement of pressure with durable apparatus poses some extremely difficult challenges. Most conventional pressure measuring instruments for measuring pressures in a fluid will melt when exposed to temperatures approaching 3,000 degrees Kelvin (K). Also, with conventional pressure sensors used in a dynamic flowing gas system, only the pressure of the boundary layer gas near the sensor is measured. Conventional pressure sensors also typically require some type of mechanical movement which inherently imposes limitations on the speed of the measurement. Furthermore, such mechanical movement of a sensor is often inaccurate and limits the system to sensing pressure at a single point in the monitored medium.

A few known sensors have been developed to utilize optical systems that overcome some of the foregoing problems of conventional pressure sensors. For example, U.S. Pat. No. 4,612,810 discloses an optical pressure sensor that employs the use of a pressure measurement chamber located inside a light transmissive body. The medium whose pressure is to be measured is introduced into the chamber, and polarized light irradiates the body. A pressure measurement is determined from a variation in the intensity of the polarized light. The problem with this technique is that the measuring instrument must be placed in contact with the medium being measured. This is not a reasonable option in a situation where the medium to be measured is such that direct contact by a pressure measuring instrument would prove to be destructive to the instrument.

U.S. Pat. No. 4,321,831 discloses another optical pressure sensor. However, this sensor, like the sensor described in the above-noted patent '810, operates by the measurement of the variation in intensity of light. It also required fiber optic cables that must physically interact with the medium being measured. Another known pressure measuring apparatus is the HBM Corporation's Model PE0-200-2000 strain gauge sensor which employe an integral microprocessor and amplifier. However, the accuracy of this kind of device is limited and relies on an electrical readout which makes it vulnerable to electrical interference.

Nothing in the prior art known to the present inventor discloses a non-intrusive system for integrating and sensing the pressure across entire body of fluid medium rather than simply measuring the pressure at one point in the medium. Also, there is nothing in such known prior art which provides a pressure sensor that cannot be either damaged by accidental overpressure, or that is not vulnerable to electrical interference. In addition, nothing in the prior art known to the inventor provides for an optical pressure sensor that is accurately and continously operable in an intense radiation environment at elevated temperatures greater than 1000K.

SUMMARY OF THE INVENTION

It is an object of the invention to provide a method and apparatus for detecting the pressure of a fluid medium which provides an accurate measurement of the integrated pressure across a body of a medium rather than providing only a single point pressure measurement.

It is another object of the invention to provide a method and apparatus for detecting the pressure of a fluid medium, which method and apparatus utilizes the refractive index of the medium to determine its pressure.

It is still another object of the invention to provide a method and apparatus for detecting the pressure of a fluid medium, which apparatus and method do not require the use of moving pans, thereby allowing exceedingly fast response time for the detecting means.

It is still another object of the invention to provide a method and apparatus for detecting the pressure of a fluid medium, which apparatus or method implementing means has its measuring means positioned remotely from the medium.

Another object of the invention is to provide a method and apparatus for detecting the pressure of a fluid medium when the temperature of the medium is known.

It is another object of the invention to provide a method and apparatus for detecting the temperature of a fluid medium when pressure is known.

The invention is a method and apparatus for detecting the pressure or density in a fluid medium. Light means for simultaneously producing a light beam having two frequencies is provided, with the two frequencies being separated by a predetermined quantity. A detecting means is provided, associated with said light means, for determining differences in frequency between the two frequencies after only one light beam frequency is passed through the medium and is then compared with the other beam frequency. The detecting means produces a signal corresponding to that difference. In addition, reflective means for directing light through said medium to said detecting means is provided. Measurement means are provided in association with detecting means for convening the signal produced by said detecting means to an output corresponding to the pressure/density of the medium.

DETAILED DESCRIPTION OF PREFERRED EMBODIMENTS

Figure 1:
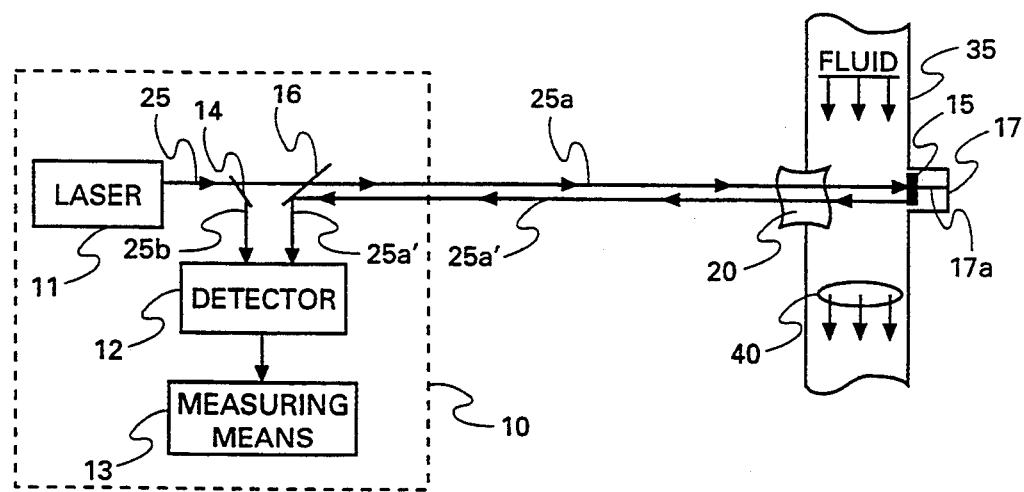
FIG. 1 is a block diagram of one preferred embodiment of apparatus arranged to practice the invention to measure pressure of a fluid in a dynamic state, i.e. flowing through a passageway defined by a fluid container.

The invention provides an optical technique for remotely measuring the pressure of a translucent fluid medium, which may be in either a static or dynamic state. The invention may be applied to make pressure measurements of either liquid or gaseous mediums. One embodiment of the apparatus of the invention, assembled as a pressure gauge which uses light to measure fluid pressure, was found to provide accurate measurements from 0.1 pounds per square inch (psi) to pressures greater than 2000 psi, while having a resolution of 0.02 psi. It should be understood, however, that successful application of the invention is not limited to that range of measurable pressures.

As the pressure within a fluid medium increases, the local velocity of a light beam passing through the medium decreases proportionately. This principle is used in practicing the present invention to measure pressure in a translucent fluid medium by configuring a suitable light source, such as a HeNe laser, to generate as a dual wavelength light beam, in combination with other instrumentation apparatus, as described herein to disclose preferred embodiments of the invention. Implementation of the invention is accomplished using magnetic Zeeman effect line splitting. Such a laser will simultaneously emit a beam containing two frequencies.

In the preferred embodiment described initially below, the two emitted beam frequencies are separated in frequency by about 2 MHz, in order to provide reliable output readings of pressure levels both above and below the level corresponding to the fundamental beat frequency produced by the pressure detector means. When this two wavelength laser is directed onto a suitable conventional non-linear detecting means, such as a diode detector or other non-linear detector with a 2 MHz response, the beat frequency (difference frequency) produced by the two wavelengths will generate an electrical output signal from the detector. (It should be understood that the relationship between the laser beam wavelength and frequency can be determined by the equation:

$$f = c/\lambda$$

where f is the frequency, c is the speed of light and X is the wavelength. Interferometry can also be used for detection of the fluid pressure related signals. This process is more commonly known as heterodyning.

In such a dual frequency laser beam apparatus, if either one of the two beams changes frequency, a different beat frequency will appear on the detector, which then generates an output signal corresponding to that change. For instance, if one of the two beams is reflected off of a moving mirror, that beam will then produce a Doppler affect frequency shift, which would be apparent in the associated diode detector output signal. This is, for example, how the Doppler weather radar commonly seen on television weather reports operates. With the weather radar, rather than involving the use of a moving mirror, it is moving raindrops that reflect the signal that then produces a frequency different from the original source beam frequency.

If, instead of having a beam-reflecting mirror move, a mirror is maintained stationary, but the air pressure between the source of the laser beam and the mirror is increased, a beat frequency will be displayed by a detector that is arranged to compare the laser source with the reflected beam frequency, which makes the output signal look the same as though the mirror were moving away from the laser. This happens because the increase in pressure adds molecules to the optical path thereby lengthening it, although the physical path length does not increase.

The electronics in the interferometer measurement system of the preferred embodiment disclosed herein are designed to track this beat frequency, record the amount of the pressure/density related frequency shift, and convert the beat frequency signal to a pressure/density measurement. Since this apparatus actually measures density of the fluid medium through which one light laser frequency is passed, the temperature of the medium must remain substantially constant if the pressure is to be measured accurately; alternatively, if the temperature is to be measured, the pressure must remain substantially constant during the measurement.

The preferred apparatus is also unique in that it operates to perform the measurement function by using light beam and the apparatus does not use moving parts. Its time response can, therefore, be exceedingly fast. It is capable of measuring fast pressure transients, like those that occur in shock tunnel experiments, as well as being able to measure, in real time, the pressure waves in explosion experiments. Conventional pressure gauges with moving parts could never track pressure changes as fast as such a simple light beam system for pressure measurement.

FIG. 1 is a schematic and block diagram of a particularly preferred embodiment of the invention. As shown, the invention operates to make an integrated measurement of pressure laterally across a dynamically flowing translucent fluid medium 40, thus avoiding the kinds of large errors that usually occur when only a single point is measured to ascertain the pressure of such a medium. The invention employs the use of a laser interferometer 10, or other suitable light means for producing a beam, which is non-damaging to the measured fluid medium 40, and it will be seen that the apparatus of the interferometer does not maintain any direct contact with the medium. Interferometer 10 utilizes a suitable conventional HeNe laser 11 configured to operate as a dual wavelength laser, suitable detecting means, such as a photomultiplier or a non-linear diode detector 12, and an output signal measuring means 13. Any diode detector well known in the art and having the desired 2 MHz response could serve as such a suitable diode detector 12. An example of such a typical non-linear diode detector is commercially available from Hamamatsu Corp. of Bridgewater, N.J., under its Part No. S2839. Alternatively, the interferometer 10 can comprise the commercially available Hewlett Packard Model No. 5528A interferometer, used with a suitable measuring means (13).

The laser 11 emits a dual frequency light beam 25 in which the two frequencies are preferably separated in frequency by about 2 MHz. Laser 11 directs one frequency of light beam 25, as a single frequency beam 25a, through a conventional beam splitter 14 and thence through a window 20 located in the wall of a pipe or other fluid medium container 35. Of course, window 20 must be thick enough and adequately securely mounted to withstand the highest expected pressure on the fluid within the container. The dual frequency light beam 25 is also split by beam splitter 14 so that the other frequency of the beam is reflected as a single frequency beam 25b to the non-linear diode detector 12. The single frequency beam 25a is directed into the fluid medium 40 and reflected back through the medium 40 (as illustrated by the beam 25a' in FIG. 1 ) by a mirror 15, and thence to a second conventional beam splitter 16, which is effective to direct the reflected beam 25a' to the diode detector 12.

Mirror 15 may be a conventional retro-reflector for ease of alignment. Preferably, mirror 15 should be at least twice the diameter of the single frequency laser beam 25a. It is mounted solidly on the interior of the fluid medium container 35 at a position opposite to the wall thereof containing the window 20 and is positioned substantially perpendicular to the path of light beam 25a. Preferably, mirror 15 is mounted using a conventional temperature compensating re-entrant mount of the kind well known in the laser/optics field. As shown in FIG. 1, the re-entrant mount 17 is formed in a cup shape with the lip of the cup being sealed to the wall of container 35 and with a mirror-supporting post 17a being mounted on the bottom of the cup. To enable the re-entrant mount to compensate for thermal expansions as the system temperature changes, the expansion of the cup walls is offset by expansion of the post 17a, so that mirror 15 is maintained in a virtually fixed position, otherwise it will be understood that movement of the mirror relative to the beam 25a could introduce an error into the pressure measurement obtained with the apparatus of the invention.

When the two laser beam frequencies, i.e. those of beam 25b and reflected beam 25a' are compared in diode detector 12, a beat frequency between the two wavelengths, or difference in frequency between the two wavelengths, will be generated as an output electrical signal from the diode detector 12. The detector 12 signals a change in the beat frequency when the optical pathlength, not the physical pathlength, between the laser 11 and the mirror 15 is varied as the fluid pressure of the medium 40 undergoes change, i.e. either increases or decreases in pressure. The frequency of the beam 25a and reflected beam 25a' changes in direct proportion to changes in the pressure of fluid medium 40, thereby causing a different beat frequency to be generated by the detector 12, which produces an output signal corresponding to that pressure change. The electronics in the interferometer system 10 track this beat frequency, record the amount of the frequency shift as an output signal, and the measuring means 13 converts the frequency shift signal to a pressure measurement output reading. Since the variation in frequency of the beams 25a/25a' sensed by the apparatus actually measures density changes in the translucent fluid medium 40, the temperature of the medium must be either kept constant during the pressure measurement, or it must be measured and appropriately compensated for, in order to assure an accurate pressure output reading by the measuring means 13.

Figure 2:
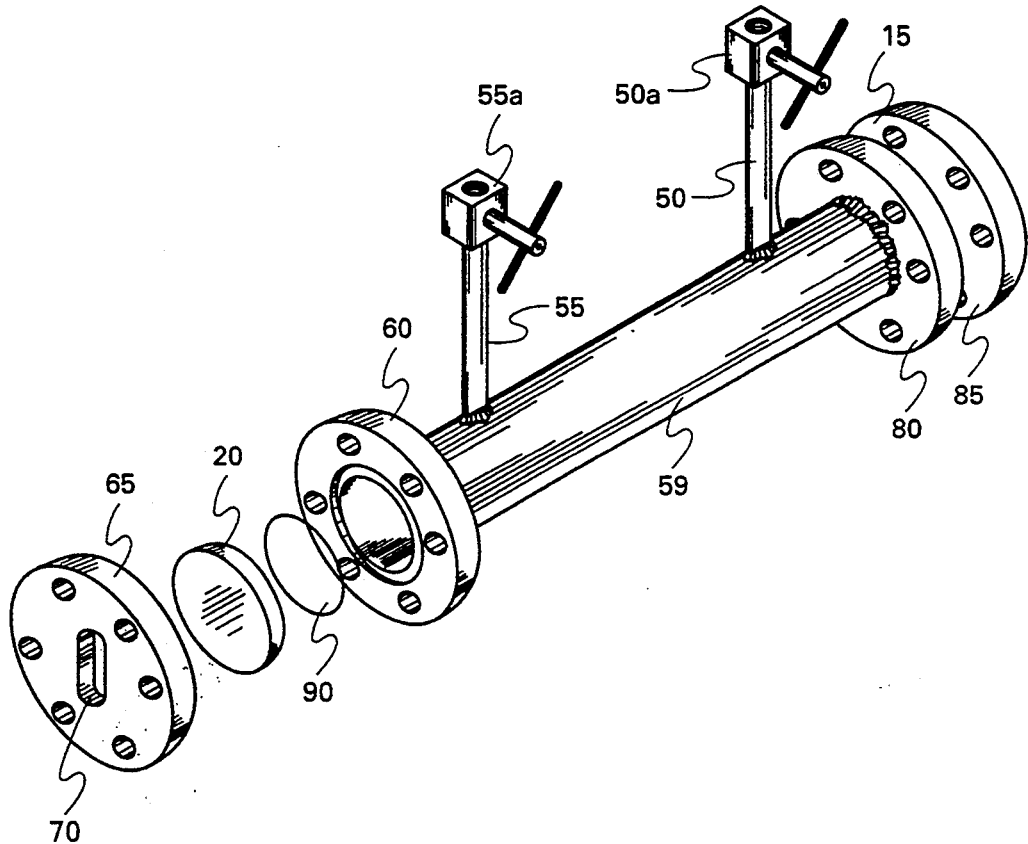
FIG. 2 is a perspective of a sealable fluid medium containing pressure cell in which a fluid hose pressure is to be measured by the present invention is held in a static state.

To further explain characteristic structural features of one preferred embodiment of the invention, FIG. 2 illustrates a pressure cell 59 wherein a fluid medium, such as a gas (not shown) is housed under static pressure. The medium is introduced into the pressure cell through a conventional pipe inlet 50 and is removable from the pressure cell through an outlet pipe 55. When the cell 59 is filled with a translucent fluid medium under static pressure, pipes 50 and 55 can be sealed by closing conventional valves 50a and 55a. A window 20 (shown in an exploded view arrangement, aligned for assembly) is mounted (when assembled in operating position) onto the pressure cell between a front interior ranged window mount 60 and a front exterior window mount plate 65. Exterior window mount 65 has slot 70 through it to allow for introduction of a laser light beam through exterior window mount 65 and window 20. Window 20 is suitably sealed against leakage by a conventional resilient O-ring seal 90. If the device were to be assembled for use in making particularly high temperature measurements that might destroy such a resilient seal, some other type of conventional seal than the depicted O-ring would be used. In this embodiment, a mirror 15 is mounted between a back interior ranged mirror mount 80 and a back exterior mirror mount plate 85, with which another suitable O-ring seal (not shown) or other suitable sealing means is used.

Figure 3:
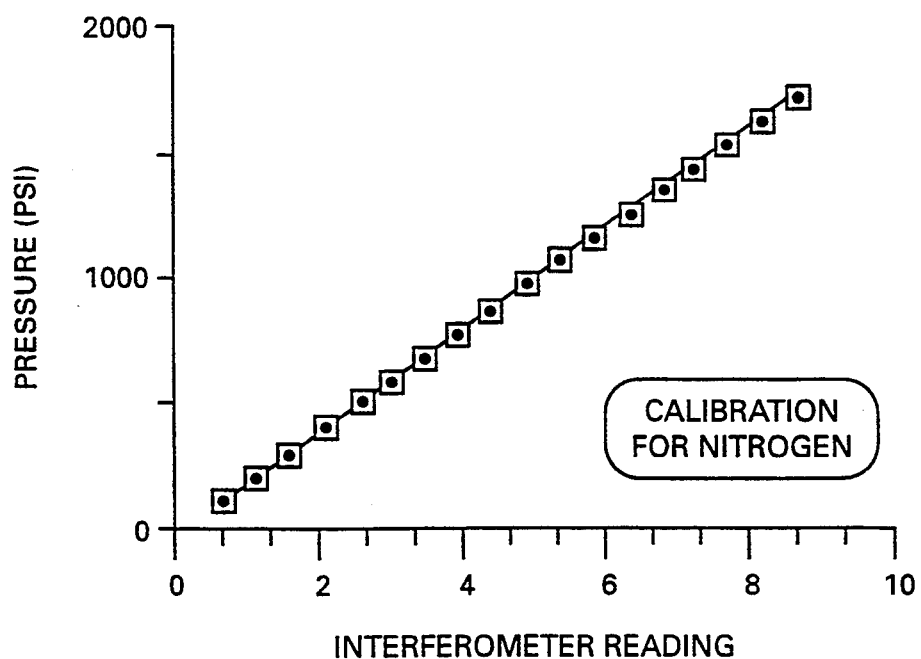
FIG. 3 is a graph of the calibration of a fluid pressure measuring means constructed according to the invention for use in measuring the pressure of a fluid such as hydrogen gas, under relatively high static pressure conditions.

FIG. 3 is a graph illustrating calibration of the type of pressure measuring apparatus shown in FIG. 1, when the apparatus is to be applied with a static pressure gas containing pressure cell, such as the cell 59 shown in FIG. 2. Exemplary fluid medium pressures measured within the cell and corresponding interferometer readings, such as the output signals from detector 12 shown in FIG. 1, as converted by a measuring means such as means 13, are also provided on the respective axes of the graph. As the graph demonstrates, readings generated by the interferometer frequency shift sensor can be empirically converted with such calibration data into the accurate pressure readings for the medium within the type of static pressure cell shown in FIG. 2. Of course, a standard pressure measuring means would be used during such a calibration procedure to determine the pressure levels that correspond to the respective interferometer readings produced with the apparatus of the invention.

Figure 4:
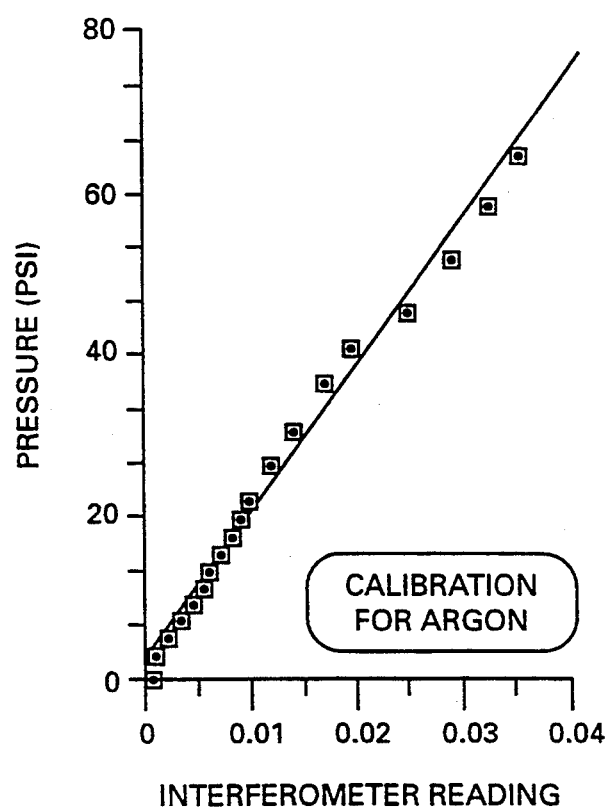
FIG. 4 is a graph of the determination of a pressure measuring means for measuring relatively low pressure dynamic fluid, such as Argon gas. The calibration is for laser-return signal readings produced by a dynamic pressure measuring system arranged according to the invention.

FIG. 4 is a graph of the determination of relatively low pressure dynamic gas pressures, such as might be measured in the container 35 shown in FIG. 1, calibrated to interferometer readings, using the apparatus depicted in FIG. 1. Due to the respective indexes of refraction for each type of translucent fluid medium to be measured, in practicing the invention it is necessary to determine a calibration curve for each such new medium whether it is a gas or liquid medium. Such appropriate calibration curves are obtained experimentally using a standard pressure gauge to calibrate the interferometer of the invention. In addition to appropriately accounting for temperature variations in a fluid medium that is to be measured with the invention, another system parameters to be considered in calculating such calibration curves includes compensating for or preventing errors in reflective angle resulting from excessive vibration. This kind of error can be largely overcome if conventional retroflector mirrors are used, as was suggested above. In such an application the reflective angle is not critical to the successful operation of the invention.

In the operation of the embodiment of the invention shown in FIG. 1, after it has been suitably calibrated for measuring a selected fluid medium, such as hydrogen gas, which would flow through the container 35, as the fluid medium 40, an operator would read the output interferometer reading produced by the measuring means 13, and convert it to a corresponding integrated pressure reading across the container 35, along the path of beams 25a/25a'. It should be appreciated that once such a calibration curve has been obtained, the measuring means 13 could be programmed to automatically convert the interferometer reading produced by the output signal of the detector 12, thereby to give a direct readout of the pressure of the medium 40.

While there have been described what are at present considered to be the preferred embodiments of the invention, it will be apparent to those skilled in the art that various changes and modifications may be made therein without departing from the teachings of the invention, therefore, it is intended to cover all such changes and modifications as fall within the true spirit and scope of the invention in the following claims.

I claim:

1. An apparatus for measuring the pressure of a translucent fluid medium comprising:

a light producing means that is operable to emit a dual frequency light beam, said two frequencies being separated by a predetermined quantity;

a beam splitter for separating said light beam into two beams each of which, respectively, have a different one of said dual frequencies;

detecting means arranged in operable relation with said light producing means for determining difference in frequency between the two light beams and to produce a signal corresponding to that difference or beat frequency, said beam splitter being operable to direct one of said beams to the detecting means;

reflective means for directing the other of said light beams along a pathway through said medium and to said detecting means; and measuring means for converting the beat frequency signal produced by said detecting means to an output corresponding to the integrated pressure of the fluid medium along the path traversed by said other light beam therethrough.

2. The apparatus of claim 1 wherein said detecting means is a non-linear detector for determining a shift in the beat frequency between said two light beams.

3. The apparatus of claim 2 wherein said non-linear detector is a diode detector.

4. The apparatus of claim 3 wherein said reflective means includes a disposed to reflect said other light beam along at least a portion of said pathway through the fluid medium.

5. The apparatus of claim 4 wherein said light producing means comprises at least one laser.

6. The apparatus of claim 5 wherein said laser is a dual frequency laser.

7. The apparatus of claim 2 wherein said non-linear detector is a photo multiplier.

8. An apparatus for measuring the pressure of a translucent fluid medium comprising:

an interferometer that is calibrated to provide a pressure measurement of said medium and that is operable to generate a light beam, split said beam into a first and second beam, pass the first beam through said medium thereby to cause a variation in its frequency corresponding to the pressure of the medium, direct the first beam by a beam splitter and the second beam by reflective means to a detector that generates a signal corresponding to the difference in the frequencies between said first and second beams, and produce an output reading that is a function of said difference and that provides a measurement of the pressure of said medium, whereby an accurate and rapid measurement is provided.

9. A method for detecting and measuring the pressure in a translucent fluid medium comprising the steps of:

containing said medium in a container;

generating a laser beam having dual frequencies;

using an interferometer including means to separate said dual frequency beam into a first beam and a second beam, and including a non-linear detector and means for directing said first beam to the detector and to direct the second beam through said medium whose pressure is to be measured;

reflecting said second beam back through said medium to the non-linear detector;

optically mixing said first and second beams in the non-linear detector to produce an output signal corresponding to the beat frequency between the two beams; and convening said beat frequency to a value that corresponds to the integrated pressure of said fluid medium along the pathway of said second beam through the fluid medium.

* * * * *